Dec. 29, 1931.  J. E. ANDERSON  1,838,981

ELECTRICAL FISHING APPARATUS

Filed Nov. 23, 1929

INVENTOR:
BY J. E. Anderson
H. J. Sanders
ATTORNEY

Patented Dec. 29, 1931

1,838,981

UNITED STATES PATENT OFFICE

JONAS EDWIN ANDERSON, OF PROCTOR, VERMONT

ELECTRICAL FISHING APPARATUS

Application filed November 23, 1929. Serial No. 409,347.

This invention relates to electrical fishing apparatus and contemplates the provision of such apparatus carried by a fishing vessel and comprising a fish hook trolled or submerged in the water to attract the fish and means for electrically charging the fish hook when a pull upon the line indicates a catch, so that the fish may be stunned temporarily to facilitate landing same in the boat.

More specifically the invention consists in the combination and arrangement of parts as will be hereinafter fully set forth, pointed out in the appended claims and illustrated in the accompanying drawings which forms a part of this application for patent and in which—

Like reference characters denote corresponding parts throughout.

Figure 1:
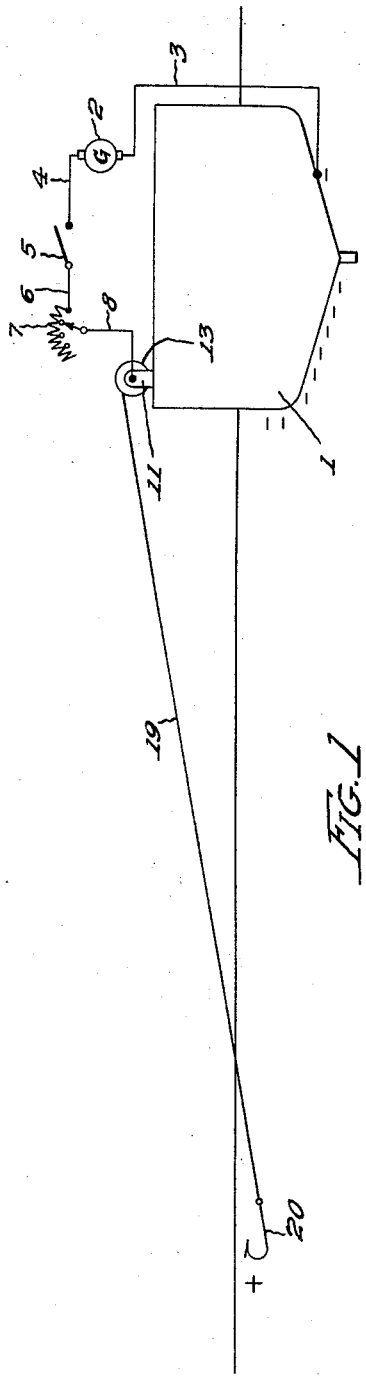
Fig. 1 is a view of the fishing apparatus installed upon a fishing vessel or smack.
Figure 3:
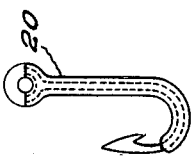
Fig. 3 is a detail view of the fish hook showing how all but the terminals thereof are insulated.
Figure 4:
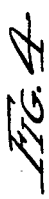
Fig. 4 is an enlarged cross sectional view through the line.
Figure 2:
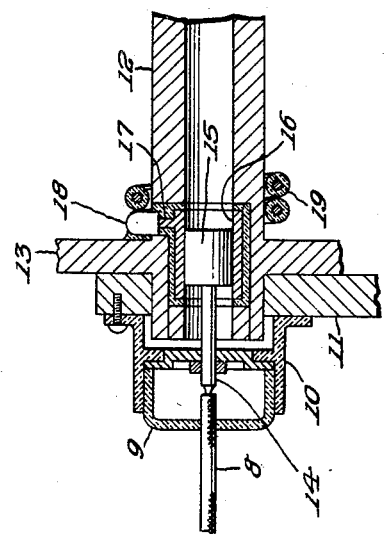
Fig. 2 is an enlarged fragmentary sectional view of the apparatus showing the line reeling mechanism and the electrical transmission mechanism for imparting current to the line and hook when desired.

The reference numeral 1 denotes a fishing smack to which the apparatus is to be applied and which comprises the generator 2 from which the wire 3 extends into the water and is grounded against the metal hull of the smack.

Another electrical conductor 4 runs from the generator to the switch 5 and a wire 6 from the switch to the rheostat 7 from which member the electrical conductor 8 extends into the coupling box 9 that is secured by bracket 10 to the standard 11 that receives one end of the sectional drum or reel 12, one flange 13 of which abuts said standard.

Engaging the enclosed end of the conductor 8 within the coupling box is the end of the electrical conductor 14 that terminates in the rotary head 15 disposed within the open ended copper sleeve 16, within the reel and insulated therefrom, and formed with a spur 17 that extends through a perforation in the reel for contact with one exposed end 18 of the insulated line conductor 19 that is wound upon said reel. The line 19 at one end carries the hook 20 that is insulated except at its extremities. By rotating the reel in one direction, either by power or by hand, the line 19 may be wound thereupon to draw in the hook and by rotating said reel in the opposite direction the line is paid out to submerge or troll the hook which is baited to attract the fish.

When a pull upon the line denotes a catch the switch 5 can be closed to cause the hook to be charged electrically.

What is claimed is:—

1. In an electrical fishing apparatus, a floating support having a metal body portion, a source of electrical current carried thereby and including a rheostat, an electrical conductor leading from said source into the water and grounded against said metal body, a reel carried by said support, a sleeve within said reel and insulated therefrom, a spur formed upon said sleeve and extending through a perforation in said reel, a line conductor carried by said reel and having one end in contact with said spur, an electrical conductor within said sleeve and communicating with the source of electric current, and a hook carried by said line conductor.

2. In electrical fishing apparatus, a floating support having a metal body portion, a source of electrical current carried thereby and including a rheostat, an electrical conductor leading therefrom into the water and grounded against said body, a sectional reel carried by said support, a sleeve conductor within said reel and insulated therefrom, a line conductor wound upon said reel with one end in contact with said sleeve, the opposite end being trolled through the water, an electrical conductor within said sleeve and communicating with the electrical source, and hook carried by the trolling end of said line conductor.

In testimony that I claim the foregoing as my own I have hereto affixed my signature.

JONAS EDWIN ANDERSON.